United States Patent [19]

Yasumatsu et al.

[11] 4,426,477
[45] Jan. 17, 1984

[54] THERMOPLASTIC RESIN COMPOSITION

[75] Inventors: Toshihito Yasumatsu, Fujiidera; Toshiaki Nakase, Hirakata; Toshinori Kubozuka, Kyoto; Kaoru Kawabata, Yahata, all of Japan

[73] Assignee: Riken Vitamin Co., Ltd., Tokyo, Japan

[21] Appl. No.: 407,805

[22] Filed: Aug. 13, 1982

[30] Foreign Application Priority Data

Aug. 21, 1981 [JP] Japan .................................. 56-131236

[51] Int. Cl.$^3$ ..................... C08K 5/10; C08L 27/06; C08L 31/06; C08L 27/08
[52] U.S. Cl. ..................... 524/306; 523/100; 523/122; 524/311; 524/312; 524/313; 524/504; 524/563; 524/567; 524/568; 524/569
[58] Field of Search ............... 523/100; 524/306, 311, 524/312, 313, 563, 568, 569, 504, 567

[56] References Cited

U.S. PATENT DOCUMENTS

| | | | |
|---|---|---|---|
| 2,633,456 | 3/1953 | Vaughan | 523/100 |
| 3,390,115 | 6/1968 | Hagemeyer et al. | 524/306 |
| 3,578,621 | 5/1971 | Stapfer | 524/306 |
| 4,072,790 | 2/1978 | Creekmore et al. | 523/100 |
| 4,073,782 | 2/1978 | Kishi et al. | 523/100 |
| 4,143,011 | 3/1979 | Hisazumi et al. | 524/313 |
| 4,363,891 | 12/1982 | Rosen et al. | 524/569 |

OTHER PUBLICATIONS

"Code of Federal Regulations", Food and Drugs 21, Revised as of Apr. 1, 1981; and Food Chemicals Codex, Third Edition, (1981).

*Primary Examiner*—Ronald W. Griffin
*Attorney, Agent, or Firm*—Armstrong, Nikaido, Marmelstein & Kubovcik

[57] ABSTRACT

A thermoplastic resin composition prepared by adding, to a vinyl chloride resin composition or its homologous series resin composition, a glycerin ester represented by the following formula:

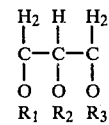

wherein $R_1$, $R_2$ and $R_3$ represent each an acyl group or a hydrogen atom, said acyl group comprises one having 2 carbon atoms and one consisting mainly of those having 10 to 14 carbon atoms, the acyl group having 2 carbon atoms is present in an amount, on the average, of up to 2 mol per mol of glycerin, the acyl group consisting mainly of those having 10 to 14 carbon atoms are present in an amount, on the average, of at least 0.9 mol per mol of glycerin and the total amount of the acyl groups is, on the average, 2.7 to 3.0 mol per mole of glycerin.

9 Claims, No Drawings

THERMOPLASTIC RESIN COMPOSITION

DETAILED DESCRIPTION OF THE INVENTION

This invention relates to a thermoplastic resin composition and, more particularly, to a thermoplastic resin composition prepared by adding a plasticizer having sufficient sanitary safety to a vinyl chloride resin.

In recent years, owing to the sanitary problems, there is a tendency toward avoiding the use of phthalate plasticizers and 2-ethylhexanol plasticizers in vinyl chloride resin products to which sanitary safety is indispensable. In such a field, the development of novel plasticizers which are sufficiently safe and satisfactory with respect to economy and function has been demanded.

As a result of an eager study made to meet such a demand, we have found that a glycerin ester having acyl groups comprising those having 10 to 14 carbon atoms and those having 2 carbon atoms is excellent as a plasticizer for vinyl chloride resins, while glycerin esters having acyl groups comprising those having 18 carbon atoms and those having 2 carbon atoms, known conventionally in the art, have poor plasticizing ability, and achieved this invention.

The glycerin ester of this invention is accepted at present also as a food additive, can therefore be used in the vinyl chloride resin without any problem and, because the ester itself is edible, can meet demands of related industries and consumers.

Because of its nontoxicity and edibility, the glycerin ester plasticizer of this invention can be used as a plasticizer not only for packaging materials in direct contact with food, that is, packaging films, wraps and molded containers, but also for vinyl chloride resin products required to have sanitary safety, such as medical appliances, tubes and toys.

The glycerin ester of this invention is represented by the following general formula

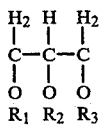

wherein $R_1$, $R_2$ and $R_3$ represent each an acyl group or a hydrogen atom and said acyl group comprises one having 2 carbon atoms (hereinafter referred to as $C_2$ acyl group) and one consisting mainly of those having 10 to 14 carbon atoms (hereinafter referred to as $C_{10-14}$ acyl group), the $C_2$ acyl group is present in an amount, on the average, of up to 2 mol per mol of glycerin, the $C_{10-14}$ acyl group is present in an amount, on the average, of at least 0.9 mol per mol of glycerin and the total amount of the $C_2$ acyl and $C_{10-14}$ acyl groups is, on the average, in the range of 2.7 to 3.0 mol per mol of glycerin. The total amount of the acyl groups is preferably in the range of 2.9 to 3.0 mol per mol of glycerin.

The $C_2$ acyl group can be derived from acetic acid and, in practice, there can be used general industrial acetic acid, edible acetic acid, acetic anhydride and glycerin triacetate.

The $C_{10-14}$ acyl group can generally be derived from coconut fatty acids, hardened coconut fatty acids, synthetic fatty acid, fatty acid from fractionated and purified natural oil and fat but because of function, economy, availability and the like, coconut fatty acids or hardened coconut fatty acids is preferred. These fatty acids contain 12-carbon acids as the main components.

Moreover, in view of the purpose of a plasticizer in itself, the highest possible content of the $C_{10-14}$ acyl groups is preferred, that is, when the content of 10-carbon or lower fatty acids is increased, the plasticizing ability increases but the volatility also increases unfavorably, causing troubles during molding or an increased extractability of moldings. On the contrary, an increase in the content of 14-carbon or higher components causes a decrease in plasticizing ability and gives rise to a problem in transparency and bleeding.

Thus, from the viewpoint of function and economy, the content of 10- to 14-carbon components in the $C_{10-14}$ acyl group is preferably at least 50% and the higher, the better.

Ideally, the proportion among glycerin, $C_2$ acyl group and $C_{10-14}$ acyl group is 1:2:1 (mol ratio) but, in practice, it is almost impossible to produce such a product industrially. An increase of the $C_2$ acyl group relative to glycerin leads to an increase of volatile components, while an increase of the $C_{10-14}$ acyl group leads to a decrease in plasticizing ability. Therefore, the content of the $C_2$ acyl group is, on the average, up to 2 mol, preferably, 2 mol per mol of glycerin and the content of the $C_{10-14}$ acyl group is, on the average, at least 0.9 mol or preferably 1 mol per mol of glycerin. Since the total amount of the acyl groups is, on the average, 2.7 to 3.0 mol per mol of glycerin, the balance consists of hydrogen atoms.

It is preferred that the glycerin ester used in this invention has a hydroxyl value of 50 or less, most suitably, 30 or less.

Similarly, it is preferred that the glycerin ester has a Reichert-Meissl value of at least 151, most suitably, at least 170. Neither case of a hydroxyl value of more than 50 nor case of a Reichert-Meissl value of less than 151 is preferred because such conditions cause a decrease in the plasticizing ability and an adverse effect on the bleeding and transparency.

The glycerin ester of this invention can usually be manufactured by purifying a product obtained by the interesterification of oil or fat with glycerin triacetate or by the direct acetylation of a fatty acid monoglyceride with acetic anhydride.

The glycerin ester of this invention can be added as a plasticizer in an amount of 1 to 100 parts by weight per 100 parts by weight of a vinyl chloride resin.

By the term "vinyl chloride resin" used herein is meant a vinyl chloride polymer or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The thermoplastic resin composition of this invention can also include a polymer blend of the above-mentioned vinyl chloride polymer or vinyl chloride copolymer and an olefin polymer which is a methacryl polymer or acrylonitrile-butadiene-styrene polymer (ABS resin).

This invention will be described below with reference to examples, but it should be noted that the invention is not limited by these examples.

In the examples, the samples as set forth below and di-octyl adipate (DOA) and di-octyl phthalate (DOP) taken as comparative samples were used.

|  | Sample | hydroxyl value | (1)RMV | iodine value | component(2) |
|---|---|---|---|---|---|
| plasticizer of this invention | A | 5 | 190 | 0.5 | glycerin diacetate mono (hardened coconut oil fatty acid) ester ($C_{10-14}$ fatty acid content: 71%) total acyl groups 2.97 mol (1.97 mol acetic acid included) |
|  | B | 6 | 195 | 6.1 | glycerin diacetate monolaurate ($C_{10-14}$ fatty acid content: 91%) total acyl groups 2.96 mol (1.97 mol acetic acid included) |
|  | C | 23 | 170 | 5.8 | glycerin diacetate mono (coconut oil fatty acid) ester ($C_{10-14}$ fatty acid content: 69%) total acyl groups 2.85 mol (1.8 mol acetic acid included) |
|  | D | 33 | 190 | 0.5 | glycerin diacetate mono (hardened coconut fatty acid) ester ($C_{10-14}$ fatty acid content: 73%) total acyl groups 2.80 mol (1.88 mol acetic acid included) |
| comparative plasticizer | X | 4 | 146 | 57 | glycerin diacetate monooleate total acyl groups 2.97 mol (1.93 mol acetic acid included) |
|  | Y | 68 | 180 | 5.4 | glycerin diacetate mono (coconut oil fatty oil fatty acid) ester total acyl groups 2.60 mol (1.74 mol acetic acid included) |
|  | Z | 4 | 148 | 32.0 | glycerin diacetate mono (refined tallow fatty acid) ester total acyl groups 2.97 mol (1.95 mol acetic acid included) |

(1)RMV: Reichert-Meissl value, measured according to Japan Oil Chemists' Society Standards, Analyzing Method of Oil and Fat. Hydroxyl value and iodine value were measured also according to the same standards.
(2)Total mol number of the acyl groups and mol number of acetic acid per mole of glycerin were calculated from the characteristic values of the starting materials and the data obtained by measuring the total acetic acid, hydroxyl value and saponification value of the sample obtained.

EXAMPLE 1

Each sample was tested for its fundamental functions as a plasticizer by using the following formulation.

Formulation

PVC (P=1,050), Zeon 103 EP—100 parts by weight
Ca-Zn stabilizer—1
epoxidized soybean oil—3
plasticizer—50

Test Procedures

A predetermined amount of each sample was added to the above formulation and the mixture was kneaded at 150° to 155° C. for 5 minutes between 8-inch test rollers. The rolled sheet was further pressed at 160° C. and 150 kg/cm² by using a compression molding machine to form a 1-mm thick sheet.

Results

|  | Plasti- cizer | 100% modu- lus(1) kg/cm² | Tensile strength kg/cm² | Elon- gation % | Brittle point(2) °C. | Heat- ing loss(3) % |
|---|---|---|---|---|---|---|
| plasticizer of this invention | A | 0.72 | 1.75 | 410 | −41 | 2.0 |
|  | B | 0.70 | 1.68 | 415 | −42 | 2.1 |
|  | C | 0.82 | 1.80 | 330 | −35 | 1.08 |
|  | D | 0.85 | 1.79 | 325 | −28 | 2.0 |
| compara- tive plasticizer | X | 1.08 | 2.21 | 210 | −19 | 0.4 |
|  | Y | 0.93 | 1.99 | 290 | −24 | 1.9 |
|  | Z | 1.25 | 3.00 | 180 | −8 | 0.3 |
|  | DOA | 0.61 | 1.43 | 360 | −62 | 1.9 |
|  | DOP | 0.78 | 1.60 | 310 | −38 | 0.3 |

(1)For the measurement of mechanical properties, No. 2 dumb-bell type specimen was used. The rate of stretch was 200 mm/min.
(2)At a specified temperature, five test pieces were used. The measurement temperature interval was 5° C.
(3)Measured according to JIS K-6732. Heated for 6 hr in a Gear oven at 100° C. No. 2 dumb-bell type specimen were used.
100% modulus: A force required to stretch a test piece to a doubled length. A lower value means a greater plasticizing ability.
Tensile strength: A force at which the sample breaks by stretch. A lower value means a higher plasticizing ability.
Elongation: A percentage elongation at which a sample breaks by stretch. A greater value means a greater plasticizing ability.
Brittle point: A temperature at which a cooled sample breaks by a knock. Usually, a lower brittle point means a greater plasticizing ability, but the brittle point differs with the type of plasticizer.

CONSIDERATIONS

The results show that the plasticizers of this invention have values similar to those of DOP and DOA, whereas the comparative plasticizers X, Y and Z have inferior values, which indicate that the comparative plasticizers X, Y and Z have insufficient function as plasticizers.

The plasticizers of this invention can be considered to have plasticizing abilities comparable to that of DOP.

EXAMPLE 2

Evaluation of Function by using a PVC paste resin formulation.

Formulation

PVC (P=1,300) Kaneka PSM-31—100 parts by weight
Ca-Zn liquid stabilizer—3
plasticizer—60

Test Procedures:

Bleeding Property

A compound after dearation was spread over a glass plate to form a 1-mm thick film, the film was allowed to gel for 15 minutes in a Gear oven at 180° C., the resulting sheet was left to stand at room temperature for a week, the bled matter was washed off with an acetone/IPA mixture. The sheet was dried to measure its weight loss.

Results

|  | Plasticizer of this invention |  |  |  | Comparative plasticizer |  |  |  |  |
|---|---|---|---|---|---|---|---|---|---|
| Plasticizer | A | B | C | D | X | Y | Z | DOA | DOP |
| Weight loss % | 3.4 | 3.2 | 4.0 | 3.7 | 5.4 | 4.1 | 6.9 | 3.9 | 0.8 |

CONSIDERATIONS

The results show that the comparative plasticizers X, Y and Z are not satisfactory but the plasticizers of this invention show values superior to that of DOA though they are inferior to that of DOP.

EXAMPLE 3

Evaluation by using an ethylene/vinyl chloride copolymer sheet formulation.

Formulation ethylene/vinyl copolymer 1 (P=650)—50 parts by weight
ethylene/vinyl copolymer 2 (P=800)—50
Ca-Zn stabilizer—2.0
methylmethacryl-butadiene-styrene resin—5.0
lubricant, stearic acid monoglyceride—1.0
polyethylene wax—0.3
plasticizer—3.0

Test Procedures

The above formulation was kneaded at 180°–190° C. for 5 minutes between 8-inch test rollers. The processability was judged at this point. Next, the rolled sheet was further pressed at 180° C. and 100 kg/cm$^2$ to form a 1-mm thick sheet, and then the transparency was measured.

Results

| Plasticizer | Plasticizer of this invention | | | | Comparative plasticizer | | | | |
|---|---|---|---|---|---|---|---|---|---|
| | A | B | C | D | X | Y | Z | DOA | DOP |
| Processability | ○ | ○ | ○. | ○ | △ | ○ | △ | ○ | ○ |
| Transparency | ◎ | ◎ | ○ | ○. | | ◎ | △ | ◎ | ◎ |

Criteria for judgement:
◎ ○ △ X
good → → poor

CONSIDERATIONS

The results show that the plasticizers of this invention have functions comparable to those of DOA and DOP.

EXAMPLE 4

Evaluation by using a PVC wrap formulation.

Formulation

PVC (P=1,050)—100 parts by weight
epoxidized soybean oil—10
Ca-Zn stabilizer—2
chelator—0.5
antifogging agent sorbitan laurate—1.0
polyoxyethylene alkyl ether—1.0
plasticizer—35

Test Procedures

The above formulation was molded into a wrap film by use of a 40-mm extruder and the film was subjected to tests for evaluation of properties.

Specifications of Extruder made by Tanabe Plastics Machine Co., Ltd.
screw diameter 40 mm, L/D=24, die 400 mm wide T-die,
coathunger type

Extrusion Conditions cylinder head temperature—195° C.
T-die temperature—205° C.
screw speed—25 rpm
take-off speed—20 m/min

Results

| Plasticizer | Plasticizer of this invention | | | | Comparative plasticizer | | | |
|---|---|---|---|---|---|---|---|---|
| | A | B | C | D | X | Y | Z | DOA |
| Processability[1] | ○~◎ | ○~◎ | ○ | ○ | X | △ | X | ◎ |
| Transparency, Haze %[2] | 2.1 | 2.0 | 3.0 | 3.1 | 5.1 | 3.8 | 7.0 | 3.0 |
| Bleeding[3] | ○ | ○ | ○ | ○ | X | △ | X | ○ |
| Antifogging property[4] | ○ | ○ | ○ | ○ | △ | △ | △ | ○ |

[1] processability: Judged from resin flow, film uniformity, etc.
[2] transparency: Visual inspection of a taken-off film.
[3] bleeding: Total evaluation by observing changes with the lapse of time. In this test, samples were stored in three ways: room temperature storage, storage at high humidities and high-temperature storage.
[4] Antifogging property: A beaker was filled with water and covered with a film and condensation of water drops on the film at an inside temperature of 20° C. and an outside temperature of 5° C. was observed.
Criteria for judgement:
◎ ○ ~ ◎ ○ △ X
good → → → → poor

CONSIDERATIONS

The results show that as compared with the comparative plasticizers X, Y and Z, the plasticizers of this invention are excellent in any of processability, transparency, bleeding and antifogging property and have performances comparable to that of DOA.

What is claimed is:

1. A thermoplastic resin composition obtained by blending to a vinyl chloride resin composition or its homologous series resin composition, a glycerin ester represented by the following formula:

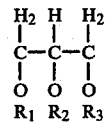

wherein $R_1$, $R_2$ and $R_3$ represent each an acyl group or a hydrogen atom, said acyl group comprises one having 2 carbon atoms and one consisting mainly of those having 10 to 14 carbon atoms, the acyl group having 2 carbon atoms is present in an amount, on the average, of up to 2 mol per mol of glycerin, the acyl group consisting mainly of those having 10 to 14 carbon atoms are present in an amount, on the average, of at least 0.9 mol per mol of glycerin and the total amount of the acyl groups is, on the average, 2.7 to 3.0 mol per mol of glycerin.

2. The thermoplastic resin composition described in claim 1, wherein the glycerin ester is at least one selected from the group consisting of glycerin diaceto mono hardened coconut oil fatty acid ester, glycerin diaceto mono coconut oil fatty acid ester, and glycerin diaceto mono laurate, having total acyl groups 2.70 to 3.0 mol and $C_2$ acyl groups up to 2 mol included.

3. The thermoplastic resin composition in claim 1, wherein the glycerin ester content of $C_{10-14}$ carbon components in the $C_{10-14}$ acyl group is at least 50%.

4. The thermoplastic resin composition described in claim 1, wherein the glycerin ester has a Reichert-Meissl value of at least 151 and has a hydroxyl value of 50 or less than 50.

5. The thermoplastic resin composition described in claim 4, wherein the glycerin ester has a Reichert-Meissl value of at least 170 and has a hydroxyl value of not more than 30.

6. The thermoplastic resin composition described in claim 1, wherein the vinyl chloride resin composition or its homologous series resin composition is a vinyl chloride polymer or a vinyl chloride copolymer selected from vinyl chloride/vinyl acetate copolymer, vinyl chloride/vinylidene chloride copolymer, vinyl chloride/ethylene copolymer and a copolymer prepared by grafting vinyl chloride onto ethylene/vinyl acetate copolymer.

7. A thermoplastic resin composition comprising a polymer blend of the thermoplastic resin composition described in claim 6 and an olefin polymer.

8. The thermoplastic resin composition of claim 7, wherein the olefin polymer is a methacryl polymer or an acrylonitrile-butadiene-styrene polymer.

9. The thermoplastic resin composition described in claim 1, wherein the glycerin ester is blended as a plasticizer in an amount of 1 to 100 parts by weight per 100 parts by weight of the vinyl chloride resin composition or its homologous series resin composition.

* * * * *

Disclaimer 4,426,477—Toshihito Yasumatsu, Fujiidera; Toshiaki Nakase, Hirakata; Toshinori Kubozuka, Kyoto; Kaoru Kawabata, Yahata, all of Japan. THERMOPLASTIC RESIN COMPOSITION. Patent dated January 17, 1984. Disclaimer filed August 28, 2001, by the assignee, Riken Vitamin Co., Ltd.

Hereby enters this disclaimer to claims 1-9.

*(Official Gazette, December 25, 2001)*

Disclaimer 4,426,477—Toshihito Yasumatsu, Fujiidera; Toshiaki Nakase, Hirakata; Toshinori Kubozuka, Kyoto; Kaoru Kawabata, Yahata, all of Japan. THERMOPLASTIC RESIN COMPOSITION. Patent dated January 17, 1984. Disclaimer filed August 28, 2001, by the assignee, Riken Vitamin Co., Ltd.

Hereby enter this disclaimer to claims 1-9.

*(Official Gazette, January 8, 2002)*